United States Patent [19]

McLean et al.

[11] Patent Number: 4,480,082

[45] Date of Patent: Oct. 30, 1984

[54] EPOXY RESIN FORTIFIERS BASED ON AROMATIC AMIDES

[75] Inventors: Paul D. McLean, Nepean; Andrew Garton, Ottawa; Robert F. Scott; Susan E. Gransden, both of Nepean, all of Canada

[73] Assignee: Canadian Patents and Development Limited, Ottawa, Canada

[21] Appl. No.: 516,575

[22] Filed: Jul. 25, 1983

[30] Foreign Application Priority Data

Aug. 12, 1982 [CA] Canada .................................. 409315

[51] Int. Cl.[3] ...................... C08G 59/50; C08G 51/04; C08L 63/00
[52] U.S. Cl. ................................... 528/103; 528/365; 528/111; 528/119; 528/361; 528/366; 564/223; 564/185; 564/200; 564/221
[58] Field of Search ............... 528/103, 365, 111, 119, 528/361, 366; 564/223, 185, 200, 221

[56] References Cited

U.S. PATENT DOCUMENTS

| | | | |
|---|---|---|---|
| 2,870,170 | 1/1959 | Payne et al. | 549/546 |
| 3,759,914 | 9/1973 | Simms et al. | 528/365 |
| 4,182,831 | 1/1980 | Hicks | 528/103 |
| 4,182,832 | 1/1980 | Zondler et al. | 528/103 |
| 4,195,152 | 3/1980 | Floyd | 528/87 |
| 4,197,389 | 4/1980 | Becker et al. | 528/103 |

*Primary Examiner*—John Kight
*Assistant Examiner*—M. L. Moore
*Attorney, Agent, or Firm*—Alan A. Thomson

[57] ABSTRACT

The reaction product of (i) an aromatic amide having the amine group of the amide attached to an aromatic ring, and (ii) a mono- or di-epoxide, has been found to be a good fortifier of epoxy resins. Epoxy resins have been found to attain increased strength and modulus (yet not brittle) by compounding:

(a) a resin-forming polyepoxide,
(b) an amine curing agent for (a), and
(c) the above fortifier; and heat curing the mixture. Strengths as high as 130–150 MPa and modulus values to as high as 5000 MPa have been achieved yet with a ductile mode of fracture.

17 Claims, 3 Drawing Figures

EPOXY RESIN FORTIFIERS BASED ON AROMATIC AMIDES

This invention relates to epoxy resin systems which have increased strength and modulus without becoming brittle. This fortification has been achieved by the addition of a reaction product of an aromatic amide and a mono- or diepoxide.

BACKGROUND AND PRIOR ART

Epoxy resin matrices are usually two-component systems, comprising a resin component [e.g. a diglycidyl ether of bisphenol A (DGEBA)] and a crosslinking agent [e.g. p,p'diaminodiphenylmethane (DDM)]. Diluents or fillers are also often added for economic or processing reasons. The resin and curing agent are mixed and "cured", usually at elevated temperatures. The above matrix would typically have a strength of 85 MPa, a modulus of 2800 MPa, a glass transition temperature ($T_g$, a maximum use temperature) of ~150° C. and would fracture in an essentially brittle fashion (H. Lee and K. Neville, "Handbook of Epoxy Resins", McGraw-Hill, New York, 1967). Considerable effort has been expended to improve on these properties.

However, no completely satisfactory solution currently exists because improvement in one property has been gained only at the expense of another (e.g. solvent resistance, $T_g$, ductility, processability, cost).

Many curing agents or hardeners have been used in epoxy resin systems, in particular amines such as methylene dianiline and tetraethylenetriamine. In some cases, adducts of these same amines with mono- or diepoxides have been used as curing agents. In U.S. Pat. No. 4,182,831, Jan. 8, 1980, Hicks, polyepoxide resins are reacted with an aliphatic primary amine mixture, then further reacted with a monoepoxide. U.S. Pat. No. 4,182,832, Jan. 8, 1980, Zondler et al, describes as curing agents for epoxy resins, adducts of substituted 1,4-diaminobutanes and liquid epoxides. U.S. Pat. No. 4,195,152, Mar. 25, 1980, Floyd, describes an adduct of N-alkylpolyamines and monoepoxides as epoxy resin curing agents. U.S. Pat. No. 4,197,389, Apr. 8, 1980, Becker et al, describes a hardening agent (curing agent) for epoxy resins which is a reaction product of an aliphatic or heterocyclic polyamine, a polyalkylene polyether polyol and at least one polyepoxide. These patents are typical of the more complex curing agents being developed.

Antiplasticization in highly crosslinked epoxy resin systems has been reported in the literature. For instance, N. Hata et al, in J. Appl. Polym. Sci., 17(7), p. 2173-81, 1973, describe pentachlorobiphenyl as the most effective antiplasticizer, and dibutylphthalate and 2,2-bis[4-(2-hydroxy-3-phenoxypropoxy)phenyl]propane as less effective antiplasticizers. There evidently has been little recent interest in this, possibly because materials such as pentachlorobiphenyl are environmentally objectionable.

We have found an alternative method of improving the properties of epoxy resins, by adding reaction products which act as fortifiers, to conventional epoxy resin + curing agent formulations.

SUMMARY OF THE INVENTION

The invention primarily is directed to a fortifier for epoxy resin compositions comprising the reaction product of:

(i) an aromatic amide having the amine group of the amide attached to an aromatic ring,
and (ii) a mono- or diepoxide. The invention includes this fortifier in admixture with an amine curing agent for epoxy resins. The invention further includes a curable epoxy resin composition comprising the fortifier, curing agent and resin, and this composition when cured to a strong, high modulus solid form having a ductile mode of fracture. The reaction product of the aromatic amide and the mono- or diepoxide may be further reacted with an isocyanate or a nitrile to form advantageous fortifiers as described below.

The invention further includes a process of preparing the fortifier comprising heating about 1 mole of the amide with from about 0.8–4 moles of the mono- or diepoxide at the equivalent of about 100°–180° C. for about 1-2 hrs. The process includes the further steps of compounding the resulting fortifier with a resin-forming polyepoxide and an amine curing agent for said polyepoxide, and heat curing the mixture to form a strong, high modulus solid having a ductile mode of fracture.

DETAILED DESCRIPTION AND PREFERRED EMBODIMENTS

Figure 1:
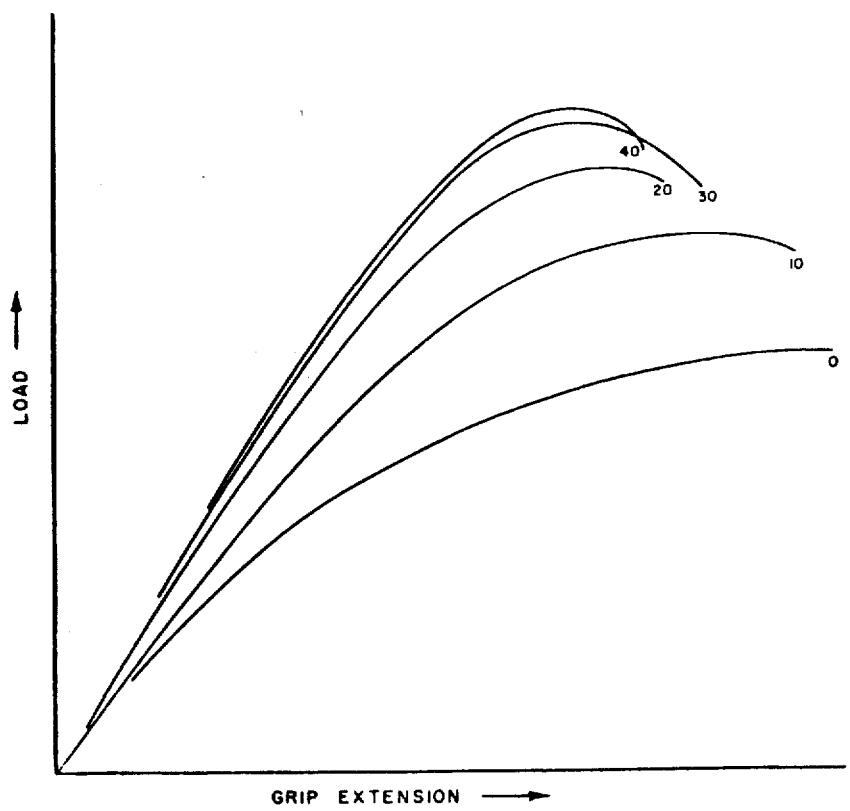
FIG. 1 is a graph showing load vs. extension curves for varying concentrations of fortifier in a cured epoxy resin system.

The resin-forming polyepoxide to be fortified can be any known to form epoxy resin matrices and will have a plurality of reactive 1,2-epoxy groups. These resin-forming polyepoxides should be curable by amine curing agents.

These polyepoxide materials can be monomeric or polymeric, saturated or unsaturated, aliphatic, cycloaliphatic, aromatic or heterocyclic, and may be substituted, if desired, with other substituents besides the epoxy groups, e.g. hydroxyl groups, ether radicals, aromatic halogen atoms and the like.

A widely used class of polyepoxides which can be fortified according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g. p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols, such as the monochlorohydrins of glycerol, sorbitol, pentaerythritol and the like.

Another class of polymeric polyepoxides which can be cured by means of the amine curing agents and fortified, includes the epoxy novolac resins obtained by reacting, preferably, in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in H. Lee and K. Neville, "Handbook of Epoxy Resins".

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Pat. No. 2,870,170 to Payne et al. Also suitable are polyglycidyl compounds produced by reacting epichlorohydrin with aromatic amines such as aniline, 2,6-dimethylaniline, p-toluidine, m-chloroaniline, p-aminodiphenyl, m-phenylenediamine, p-phenylenediamine, 4,4'-diaminodiphenyl methane, or with amino phenols such as p-aminophenol, 5-amino-1-n-naphthol, 4-aminoresorcinol, 2-methyl-4-aminophenol, 2-chloro-4-aminophenol and the like. Specific compounds include, among others, N,N-diglycidylaniline, N,N-diglycidyl-2,6-dimethylaniline, N,N,N',N'-tetraglycidyl-4,4'-diaminodiphenyl methane, the triglycidyl derivative of p-aminophenol wherein the aminohydrogen and OH hydrogen atoms are replaced by glycidyl groups.

It will be appreciated by those skilled in the art that the polyepoxide compositions which can be cured and fortified according to the practice of the present invention are not limited to those containing the above described polyepoxides, but that these polyepoxides are to be considered merely as being representative of the class of polyepoxides as a whole.

The amine curing agents are any aromatic or aliphatic amine curing agents (hardeners) known in the art. Typical examples are methylene dianiline (MDA), meta-phenylenediamine and other aromatic polyamines, diethylamine hydrochloride, diethylenetriamine, triethylenetetramine, diethylaminopropylamine, polyoxypropyleneamines and other aliphatic polyamines. Amine adducts such as reaction products of aliphatic amines with epoxide monomers and amino group-containing polyamides are known amine curing agents and would be operative. Heterocyclic amines such as N-aminoethylpiperazine and ethylmethylimidazole may also be used. We prefer the aromatic polyamines particularly when improved high temperature properties are important.

Comparative tests with and without amine curing agents have confirmed that the fortifiers are not effective curing agents. For example, a fortifier formed from vinylcyclohexenedioxide and 4-hydroxyacetanilide was added to a resin with and without the amine curing agent. Compositions containing 15 and 30 parts of fortifier per hundred parts of resin (by wt.), but no curing agent, did not gel when run through the normal cure cycle. With the curing agent plus fortifier, a significant increase in strength and modulus was achieved.

The aromatic amide reactant used to form the fortifier has the general formula:

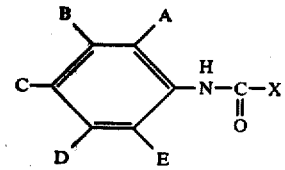

in which A to E are selected from hydrogen, lower alkyl, halogen, halogenated lower alkyl, hydroxyl, amino and an alkylene-linked aromatic amide moiety; and X is selected from hydrogen, lower alkyl, phenyl and

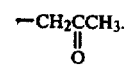

The lower alkyl or alkylene groups may have from 1–4 carbon atoms. Suitable compounds include acetanilide, acetoacetanilide, 4-hydroxyacetanilide, 2-hydroxyacetanilide, 4-aminoacetanilide, 4-chloroacetanilide, 4-bromoacetanilide, di(4-formamidophenyl)methane and 2',5'-dichloroacetoacetanilide.

The monoepoxide reactant has the general formula:

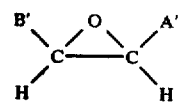

in which A' and B' are selected from hydrogen, halogen, lower alkyl, halogenated lower alkyl, phenyl, halogenated phenyl, and an alkylene-linked aromatic ether moiety. Suitable monoepoxides include ethylene oxide, propylene oxide, epichlorohydrin, styrene oxide and phenylglycidyl ether (PGE).

The alternative diepoxide reactant contains two vicinal-epoxide rings, one of which is less reactive than the other (for structural or chemical reasons). The reactivity of the less reactive epoxide group may be lower because of, e.g., being attached to an alicyclic moiety or by substituents on the alpha-carbons or because of its steric configuration. Suitable dioxides include vinylcyclohexene dioxide, limonene dioxide, bis(2,3-epoxycyclopentyl)ether (liquid isomer), and p-epoxycyclopentylphenyl glycidyl ether.

The fortifier is formed by reacting the aromatic amide and mono- or diepoxide together at a selected temperature, usually within about 70° C. to 200° C., for a time within about 15 min. to about 5 hr. Preferred reaction conditions are selected to be equivalent to 100°–180° C. for about 1–2 hrs. at a ratio of 1 mole amide to 0.8 moles epoxide. The temperature (and time) are selected to give the desired degree and mode of reaction yet not boil off the more volatile components. Depending on exotherms encountered, it may be necessary to cool the reaction vessel to maintain the desired reaction temperature. Typical temperatures and times found operative are illustrated in the examples. Catalysts can be used to facilitate the reaction if desired but we have not found them necessary. Suitable catalysts for the fortifier formation include those of the type of diethylamine hydrochloride, ethylmethylimidazole, alphamethylbenzyldimethylamine, and 2-hydroxybenzyldimethylamine. Suitable catalyst concentrations are about 0.1–0.3%.

In some cases, it is not necessary for the amide group per se to react with the mono- or diepoxide during formation of the fortifier. For instance, where a reactive hydroxyl or amino substituent is present, and limited amounts of epoxide are added, reaction may occur preferentially with these hydroxyl or amino groups. However, the presence of the amide groups is necessary to obtain, on curing the resin system, the increased strength and modulus found according to this invention.

The reaction products are a complex mixture in each case and were used as fortifiers without purification or separation. The reaction products were viscous oils or low melting point solids. Chromatographic analysis of a typical fortifier showed the presence of at least 12 chemical components in measurable amounts. Several fortifiers have been retested after at least one year of storage and they showed no signs of deterioration.

We have found that (in preparing the fortifiers) when only part of the desired amount of one of the reactants is added initially and reacted, and the remainder introduced later, the reaction product is different than if the full amount had been reacted at one time. Using this variation in properties, it is possible to select both reactants and reaction stages to optimize properties of the fortifier for a particular purpose. It is possible to add a different mono- or diepoxide at a second stage of the reaction to vary the properties further. In the same manner, variations or staged additions of the same or different aromatic amides change the properties of the fortifier somewhat. Thus, it is possible to tailor the fortifier to obtain a desired balance of properties for a particular resin system. For each resin-curing agent system, the fortifier is selected to bestow increased tensile strength and modulus on curing.

The concentration of fortifier relative to the resin (resin-forming polyepoxide) may range from an effective amount up to about 40% based on the weight of resin (PHR). Amounts within the range of 5–30 PHR normally are preferred.

These fortifiers will have some free hydroxyl groups available for further reaction. We have found that reaction with isocyanates or nitriles gives fortifiers which bestow increased strengths on the resin (compared to the original fortifier). Any monoisocyanate may be used with typical ones being methyl-, ethyl-, propyl-, and phenylisocyanates and halogenated derivatives thereof. Alternatively, nitrile reactants may be used and these may be mono- or dinitriles. Suitable nitrile reactants include p-aminobenzonitrile, phthalonitrile, malononitrile, succinonitrile, butyronitrile, adiponitrile and acrylonitrile. Halogenated derivatives of these nitriles can be used. Normally, the amount of isocyanate or nitrile will be sufficient to react with all hydroxyl groups present. The reaction conditions with nitrile reactants generally are about 1 hr at about 110° C. though variations are possible. With the isocyanates, they are added cold and usually in stages since the reaction is exothermic, preferably with the final temperature controlled to be about 120° C.

The final cure conditions of the resin-forming polyepoxide + amine curing agent + fortifier generally follow conventional epoxy resin cure techniques. Usually at least two cure stages are utilized, with preferred cure sequences being within the ranges:

| initial stage | 60°–100° C. for 30 min.–4 hrs. |
| intermediate stage | 100°–130° C. for 1 hr.–6 hrs. |
| final stage | 140°–200° C. for 1 hr.–16 hrs. |

Those skilled in the art will be able to determine a suitable cure cycle for any particular system.

The following examples are illustrative.

EXAMPLE 1

Monoepoxide With Substituted Aromatic Amide

One mole of 4-hydroxyacetanilide was heated with two moles of phenylglycidylether (PGE) to 180° C. for 30 minutes. The resulting solid of low melting point (about 50° C.) was used as fortifier by adding 30 PHR (by wt. of resin-forming polyepoxide) to a conventional epoxy resin formulation (100 parts of diglycidylether of bisphenol A resin with 30 parts of methylene dianiline curing agent). The mixture was cured at 100° C. for 6 hrs and at 160° C. for 8 hrs. Compared to a control in the absence of the fortifier, the tensile strength was increased from about 12000 psi to 19000 psi, modulus was increased by about the same proportion (from 2800 to over 4000 MPa). A ductile mode of failure occurred in the room temperature tensile strength tests.

A similar fortifier was made at a ratio of said anilide/PGE of 1:1.05 with 0.25% imidazole catalyst by heating at 160° C. for 60 minutes. At 30 PHR fortifier in the same resin system, the tensile strength was close to 19000 psi.

EXAMPLE 2

Phenylglycidylether and acetoacetanilide, in a mole ratio of 1.2 to 1, plus 5% by wt. epichlorohydrin, were mixed together and heated for 1 hr at 170° C.

This fortifier was premixed with methylenedianiline (30 parts), heated to 110° C. and cooled before resin (DGEBA) was added. Twenty-five parts of the fortifier (55 parts of the premix) were added to 100 parts of the resin and stirred and heated to 95°–100° C. and the curable mixture poured into preheated steel molds. The system was cured at 80° C. for 6 hrs followed by 160° C. for 3 hrs. The tensile strength was increased from 12300 to about 16500 psi. $T_g$ was about 105° C. (from 149° C. without fortifier) while 15 min. in boiling water reduced the strength to about 14000 psi.

Further experiments with additions of epichlorohydrin showed that small amounts (about 1%–5%) improved the tensile strength and raised $T_g$, while large amounts (>10%) caused the plastic to exhibit brittle failure. Varied ratios of PGE/AAA had little effect on $T_g$ but ratios about 1 to 1.3/1 were best for increased strength.

A similar fortifier was made at the mole ratio of PGE/anilide of 1.2/1 with 0.25% diethylamine hydrochloride as catalyst by heating at 120° C. for 90 min. With the same resin and curing conditions as in Ex. 1, a tensile strength of about 17400 psi was achieved.

In FIG. 1, graphs are shown of load vs. extension for 0, 10, 20, 30 and 40 PHR of fortifier (phenylglycidylether-4-hydroxyacetanilide) in DGEBA (Epon 828 - trademark) resin with 30 PHR of methylenedianiline as curing agent. Increased strength with increasing amounts of fortifier is evident yet with ductility.

EXAMPLE 3

Diepoxide With Substituted Aromatic Amide

One mole of 4-hydroxyacetanilide and 2.1 moles of vinylcyclohexene dioxide (VCD) were heated together to 80° C. for 15 min. The resultant fortifier, a red liquid, was added at 30 parts per hundred of resin to the same amine curing agent-epoxy resin system as in Ex. 1, and subjected to the same curing treatment. Again, the tensile strength increased from 12000 psi to 19000 psi and the modulus increased similarly to over 4000 MPa. In room temperature tensile tests the mode of failure was observed to be ductile.

A similar fortifier was made at a VCD/anilide ratio of 2/1 with 0.25% diethylamine hydrochloride as catalyst by heating at 120° C. for 2 hrs. At 30 PHR fortifier, in the same system as Ex. 1, the tensile strength was about 17500 psi.

EXAMPLE 4

Acetoacetanilide and vinylcyclohexene dioxide (VCD) were mixed at a mole ratio of 1/1.2 with 0.25% diethylamine hydrochloride added as catalyst, and heated at 100° C. for 45 min., followed by 60 min. at 160° C. At a level of 30 PHR of the same resin as in Ex. 1, this fortifier gave tensile strengths of about 16500 psi.

Figure 2:
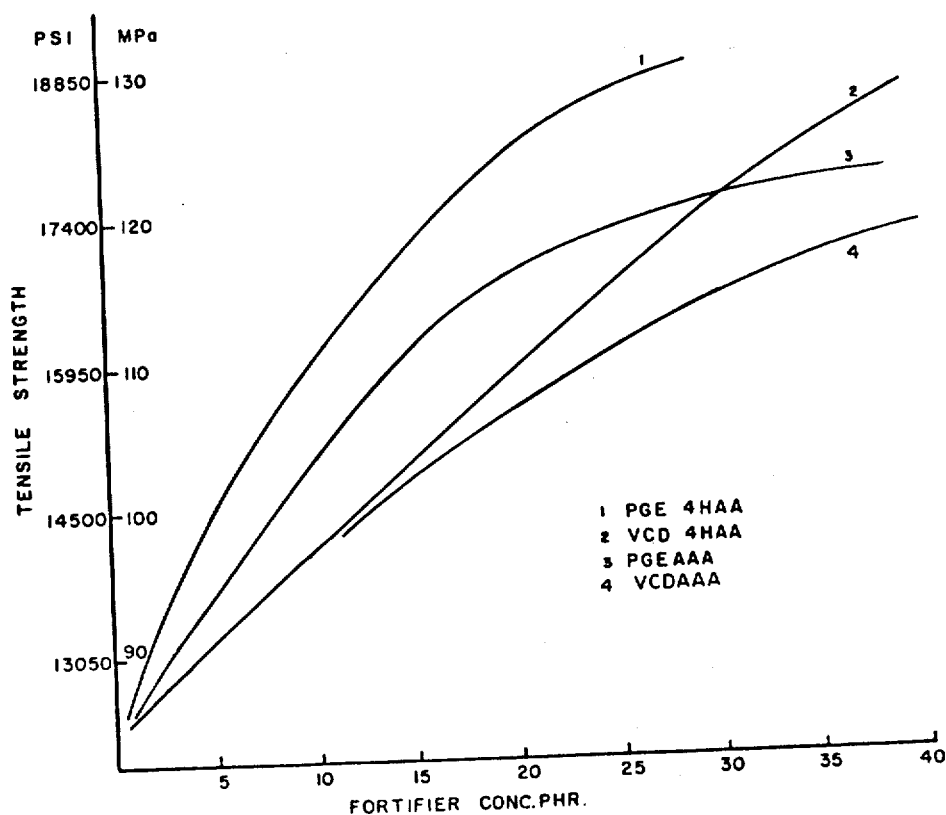
FIG. 2 is a graph showing the effect of fortifier concentration on tensile strength in a cured epoxy resin system for 4 different fortifiers.

The tensile strength vs. concentration results for 4 different fortifiers in Epon 828 with 30 PHR of methylenedianiline as curing agent, are summarized in FIG.2. Significant increases in strength are evident, particularly for the 4-hydroxy-acetanilide-based fortifiers.

EXAMPLE 5

Using as resin-forming polyepoxide, the diglycidylether of bisphenol A with aliphatic amine curing agents, the following procedure was followed and test results obtained.

A mixture of 34 parts of a polyoxypropyleneamine (Jeffamine D400 - trademark) and 4 parts of diethylenetriamine was prepared as curing agent and mixed with 100 parts of DGEBA resin (Epon 828) and 30 parts of fortifier (PGE4-hydroxyacetanilide, or VCD4-hydroxyacetanilide). Curing was at 50° C. for 1 hr + 80° C. for 1 hr + 125° C. for 4 hrs. The tensile strength results on the cured product were as follows.

| Fortifier | Tensile strength |
|---|---|
| none | 7802 psi |
| PGE-4HAA | 9176 psi |
| VCD-4HAA | 8098 psi |

EXAMPLE 6

Figure 3:
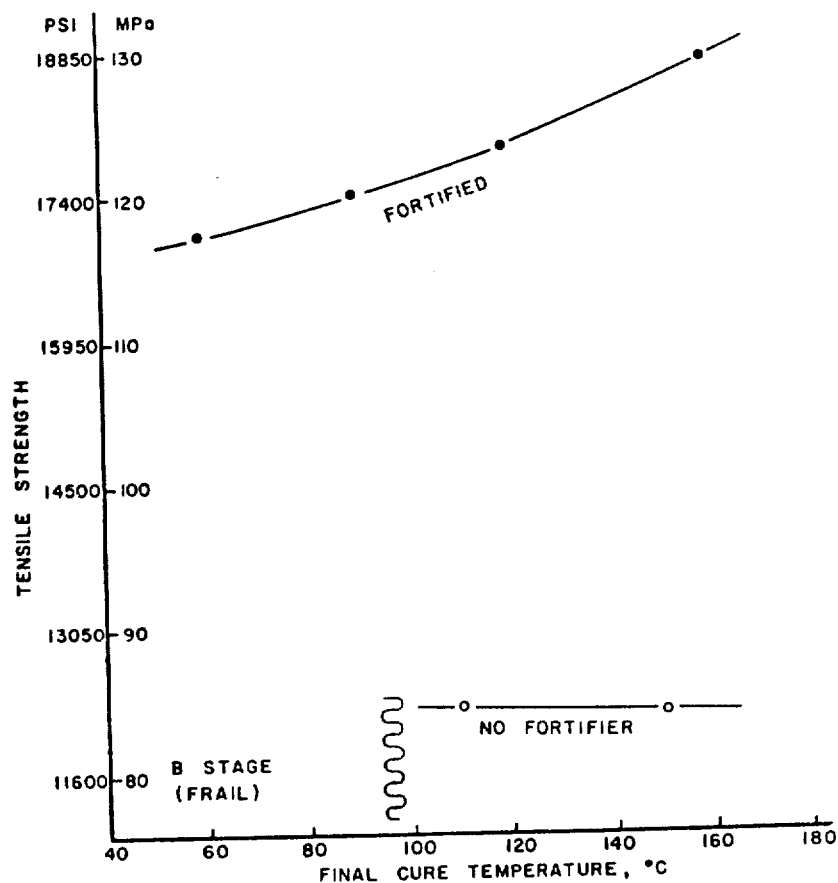
FIG. 3 is a graph showing the effect on tensile strength of final cure temperature with fortified and unfortified epoxy resin systems.

Final cure temperatures were varied for DGEBA (Epon 828) + 30 PHR methylenedianiline as curing agent, with and without PGE-4HAA fortifier at 30 PHR. The results are shown in FIG. 3. Without fortifier, curing did not occur until the final cure temperature reached about 100° C. and the cured tensile strength was constant at about 85 MPa. With the fortifier present, curing was evident at lower final core temperatures (60° C.) and the strength gradually increased with increasing final cure temperature. The fortifier significantly increased the strength (yet with a ductile mode of fracture) and allowed more flexibility in curing.

EXAMPLE 7

A cycloaliphatic epoxy resin (a cyclohexane diepoxy carboxylate) known as Araldite (trademark) CY 179 was fortified and cured. The fortifier was VCD-4HAA prepared as in Example 3 and curing was for 3 hrs. at 100° C. and then 6 hrs. at 180° C. Results were as follows.

| Fortifier PHR | Resin CY179 | Crosslinking Amine (MDA) PHR | Tensile Str psi | Tg °C. |
|---|---|---|---|---|
| 10,VCD-4HAA | 100 | 65 | 15470 | 145 |

EXAMPLE 8

A nitrile-modified fortifier was prepared by reacting one mole of the VCD/4-hydroxyacetanilide fortifier of Example 3 with one mole of p-aminobenzonitrile by heating to 150° C. for 1 hr. Upon compounding various amounts of this fortifier with Epon 828 and 30 Phr MDA and curing as in Example 1, the following results were obtained.

| amount of Fortifier PHR | Tensile Strength psi |
|---|---|
| 20 | 17700 (ductile) |
| 30 | 18900 (ductile) |

We claim:

1. A fortifier for epoxy resins comprising the reaction product of
   (i) an aromatic amide of the formula

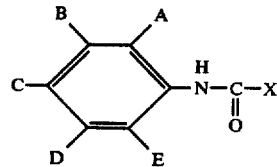

wherein A to E are selected from hydrogen, hydroxyl, halogen, lower alkyl, halogenated lower alkyl, amino, and an alkylene-linked aromatic amide moiety; and X is selected from hydrogen, lower alkyl, phenyl and

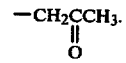

2. The fortifier of claim 1 in admixture with an amine curing agent for epoxy resins.

3. A curable epoxy resin composition comprising a resin-forming polyepoxide and the fortifier + curing agent mixture of claim 2, the fortifier being selected to bestow an increased tensile strength and modulus on curing.

4. The fortifier of claim 1 wherein the epoxide reactant of the fortifier as a monoepoxide of the formula

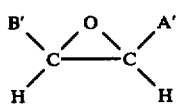

wherein A' and B' are selected from hydrogen, halogen, lower alkyl, halogenated lower alkyl, phenyl, halogenated phenyl and an alkylene-linked aromatic ether moiety.

5. The fortifier of claim 1 wherein the epoxide reactant of the fortifier is a diepoxide containing two epoxide groups one of which is less reactive than the other.

6. The fortifier of claim 1 wherein the epoxide reactant of the fortifier is vinylcyclohexene dioxide.

7. The compositions of claim 2 wherein the amine curing agent is selected from the group consisting of methylene dianiline, N-aminoethylpiperazine, meta-phenylenediamine, and tetraethylenetriamine.

8. The epoxy resin composition of claim 3 wherein the concentration of fortifier ranges up to about 40 parts by wt. per hundred parts of the resin.

9. The epoxy resin composition of claim 3 cured to a strong, high modulus, solid form having a ductile mode of fracture.

10. The fortifier component of claim 1 further reacted with an isocyanate.

11. The fortifier component of claim 1 further reacted with an isocyanate selected from methyl isocyanate, ethyl isocyanate, phenyl isocyanate and halogenated derivatives thereof.

12. The fortifier component of claim 1 further reacted with a nitrile.

13. The fortifier component of claim 1 further reacted with a nitrile selected from p-aminobenzonitrile, phthalonitrile, malononitrile, succinonitrile, adiponitrile, acrylonitrile, and halogenated derivatives thereof.

14. A process of preparing the fortifier of claim 1 comprising heating the aromatic amide and mono- or diepoxide together at within about 70° C.-200° C. for a time within about 15 min.-2 hr.

15. A process of preparing the fortifier of claim 1 comprising heating about 1 mole of the amide with from about 0.8-3 moles of the mono- or diepoxide at the equivalent of about 100°-180° C. for about 1 hr.

16. The process of claim 14 carried out in the presence of a catalyst of the type of diethylamine hydrochloride, ethylmethylimidazole, alphamethylbenzyldimethylamine, and 2-hydroxybenzyldimethylamine.

17. The process of claim 14 including the further steps of compounding the resulting fortifier with a resin-forming polyepoxide and an amine curing agent for said polyepoxide, and, heat curing the mixture to form a strong, high modulus solid having a ductile mode of fracture.

* * * * *

UNITED STATES PATENT AND TRADEMARK OFFICE
CERTIFICATE OF CORRECTION

PATENT NO.  :  4,480,082
DATED       :  October 30, 1984
INVENTOR(S) :  Paul D. McLean et al It is certified that error appears in the above-identified patent and that said Letters Patent are hereby corrected as shown below:

Insert as the last line of claim 1 at column 8 line 59

"and (ii) a mono- or di-epoxide".

Signed and Sealed this

Fourth Day of June 1985

[SEAL]

Attest:

DONALD J. QUIGG

Attesting Officer

Acting Commissioner of Patents and Trademarks